United States Patent
Jang et al.

(10) Patent No.: US 12,261,553 B2
(45) Date of Patent: Mar. 25, 2025

(54) MOTOR AND METHOD OF CONTROLLING THE SAME

(71) Applicants: HYUNDAI MOTOR COMPANY, Seoul (KR); KIA CORPORATION, Seoul (KR)

(72) Inventors: Hyung Kwan Jang, Uijeongbu-si (KR); Hoo Dam Lee, Seongnam-si (KR); Gyeong Sik Choe, Seoul (KR); Jun Hyeok Choi, Suwon-si (KR); Byung Ho Min, Suwon-si (KR); Tae Gyu Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 223 days.

(21) Appl. No.: 18/072,259

(22) Filed: Nov. 30, 2022

(65) Prior Publication Data

US 2023/0370005 A1 Nov. 16, 2023

(30) Foreign Application Priority Data

May 19, 2022 (KR) ........................ 10-2022-0061172

(51) Int. Cl.
*H02P 21/10* (2016.01)
*H02K 55/04* (2006.01)
*H02P 21/00* (2016.01)
*H02P 21/22* (2016.01)

(52) U.S. Cl.
CPC ............. *H02P 21/10* (2013.01); *H02K 55/04* (2013.01); *H02P 21/0089* (2013.01); *H02P 21/22* (2016.02); *H02P 2207/05* (2013.01)

(58) Field of Classification Search
CPC ...... H02P 21/10; H02P 21/22; H02P 21/0089; H02P 2207/05; H02K 55/04
USPC .......................................................... 318/714
See application file for complete search history.

(56) References Cited

U.S. PATENT DOCUMENTS

| 2019/0092440 A1* | 3/2019 | Grundmann | ........... H02K 55/00 |
| 2021/0408888 A1* | 12/2021 | Grundmann | ........... H02K 55/04 |
| 2022/0399838 A1* | 12/2022 | Nashiki | ................. H02P 23/009 |

FOREIGN PATENT DOCUMENTS

KR 10-1833134 B1 2/2018

* cited by examiner

*Primary Examiner* — Kawing Chan
(74) *Attorney, Agent, or Firm* — MCDONNELL BOEHNEN & BERGHOFF LLP (57) ABSTRACT

A motor includes a stator on which an armature coil is wound, a rotor disposed inside the stator, a superconducting field coil being wound thereon and, a controller configured to control the motor, in which the controller is configured to control an armature current supplied from an AC source to the armature coil and a field current supplied from a DC source to the field coil, and charge at least a certain ratio of the field coil before starting the motor.

18 Claims, 7 Drawing Sheets

MOTOR AND METHOD OF CONTROLLING THE SAME

CROSS REFERENCE TO RELATED APPLICATIONS

This application claims, under 35 U.S.C. § 119(a), the benefit of and priority from Korean Patent Application No. 10-2022-0061172 filed on May 19, 2022, the entire contents of which are incorporated herein by reference.

BACKGROUND

(a) Technical Field

The present disclosure relates to a motor and a method of controlling the same.

(b) Background Art

Electric vehicles, including hybrid electric vehicles, are partially or entirely driven by motors rather than conventional internal combustion engines. An interior permanent magnet synchronous motor (IPMSM) to which a permanent magnet is applied has been widely used as a motor of such an electric vehicle. The IPMSM is characterized by high efficiency and high output.

However, due to an advantage of cost reduction of rare-earth elements used in a permanent magnet and an advantage in that a magnetic field of a rotor may be controlled using current, active research has been conducted on a wound field synchronous motor (WFSM).

SUMMARY

The present disclosure has been made in an effort to solve the above-described problems associated with prior art, and an object of the present disclosure is to provide a motor having improved responsiveness, and a method of controlling the motor.

The object of the present disclosure is not limited to the object mentioned above, and other objects not mentioned herein may be clearly understood by those of ordinary skill in the art to which the present disclosure belongs (hereinafter referred to as "person of ordinary skill") from the description below.

Features of the present disclosure for achieving the object of the present disclosure described above and performing characteristic functions of the present disclosure to be described later are as follows.

In one aspect, the present disclosure provides a motor including a stator on which an armature coil is wound, a rotor disposed inside the stator, a superconducting field coil being wound thereon, and a controller configured to control the motor, wherein the controller is configured to control an armature current supplied from an alternating current (AC) source to the armature coil and a field current supplied from a direct current (DC) source to the field coil, and charge at least a certain ratio of the field coil before starting the motor.

In another aspect, the present disclosure provides a method of controlling a motor, the motor including a stator on which an armature coil is wound, a rotor configured rotatably inside the stator and on which a superconducting field coil is wound, and a controller configured to control the motor, the controller being configured to control an armature current supplied to the armature coil and a field current supplied to the field coil, and the method including comparing, by the controller, a target speed and a rated speed of the motor, charging, by the controller, the field coil before starting the motor when the target speed is less than or equal to the rated speed, and driving, by the controller, the motor upon determining that the field coil is charged by a preset ratio.

Other aspects and preferred embodiments of the disclosure are discussed infra.

BRIEF DESCRIPTION OF THE FIGURES

The above and other features of the present disclosure will now be described in detail with reference to certain exemplary embodiments thereof illustrated the accompanying drawings which are given herein below by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Specific structural or functional descriptions presented in the embodiments of the present disclosure are only illustrative for the purpose of describing embodiments according to the concept of the present disclosure, and the embodiments according to the concept of the present disclosure may be implemented in various forms. In addition, the present disclosure should not be construed as being limited to the embodiments described herein, and should be understood to include all modifications, equivalents, and substitutes included in the spirit and scope of the present disclosure.

Meanwhile, in the present disclosure, even though terms such as "first", "second", etc. may be used to describe various elements, the elements are not limited by these terms. These terms are only used to distinguish one element from another. For example, within the scope not departing from the scope of the rights according to the concept of the present disclosure, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions for describing a relationship between elements, that is, expressions such as "between" and "immediately between" or "adjacent to" and "directly adjacent to", should be interpreted similarly.

Like reference numerals refer to like elements throughout. The terminology used herein is for the purpose of describing the embodiments, and is not intended to limit the present disclosure. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

Hereinafter, the present disclosure will be described in detail with reference to the accompanying drawings.

A motor may be controlled in various ways depending on the type of the motor and whether or not an inverter is used. For example, it is possible to use various control methods, such as voltage control, frequency control, voltage and frequency control, voltage duty control, vector control, etc. In case of a WFSM, in addition to rotating magnetic field control for motor rotation, control of field magnetic flux serving as main flux (DC control) needs to be accompanied.

When a normal conducting coil made of copper, aluminum, etc., is used in the WFSM, time constants of both the field coil and the armature coil are small. Therefore, the WFSM having the normal conducting coil may quickly reach a target current value. Since a response speed of current is fast, there is no need for special driving control when controlling a field current, and only a part lost by a resistance of the field coil after driving is compensated.

However, in case of the WFSM including a superconducting coil, resistivity is significantly small (approximately $7 \times 10^{-23}$ ohm-cm), and a time constant is large. Therefore, it takes a long time to reach a target current value, and control responsiveness deteriorates.

Accordingly, an object of the present disclosure is to provide a method of controlling a motor capable of improving a response of the motor, in particular, a response speed of the WFSM including the superconducting coil.

Figure 1:
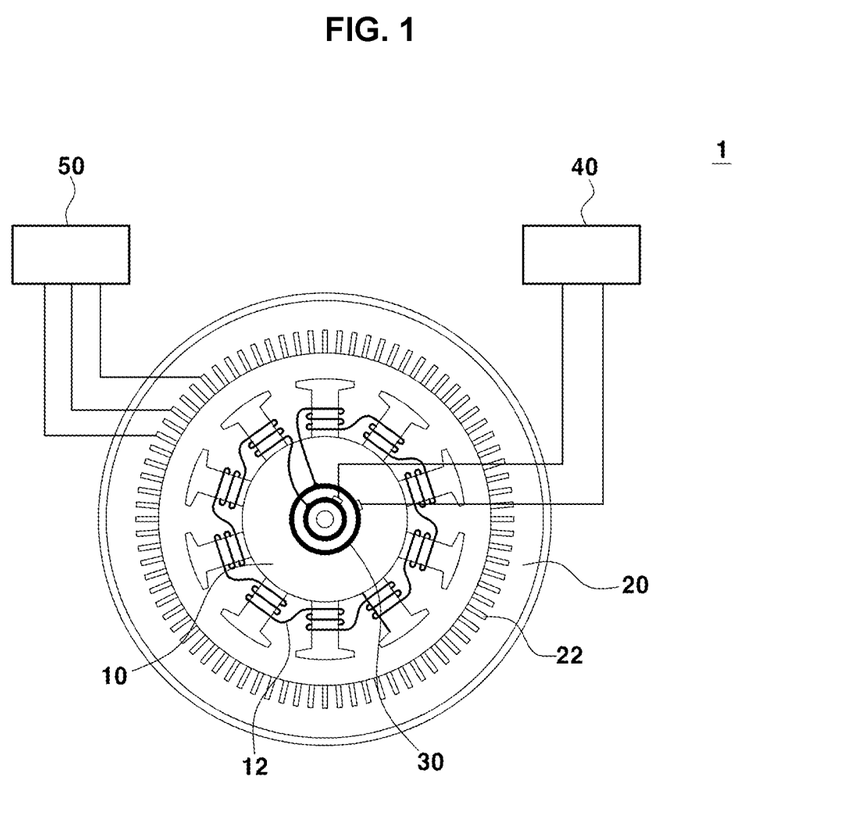
FIG. 1 is a schematic cross-sectional view of a motor according to an embodiment of the present disclosure.
Figure 2:
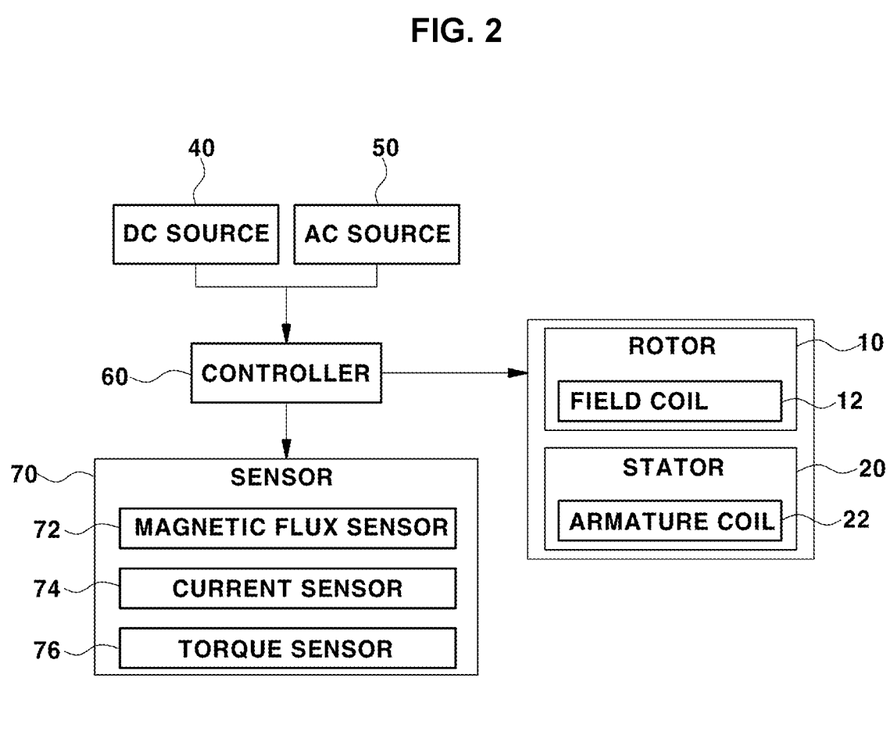
FIG. 2 is a block diagram of a control system for the motor according to the present disclosure.

FIG. 1 is a simplified cross-sectional view of a WFSM 1, and FIG. 2 is a block diagram of a control system of the WFSM 1 according to the present disclosure.

Referring to FIGS. 1 and 2, the WFSM 1 is a motor in which a field coil 12 is wound around a rotor 10 and includes the rotor 10 and a stator 20 as other types of electric motors. The field coil 12 is wound around the rotor 10, and an armature coil 22 is wound around the stator 20.

Currents are respectively supplied to the rotor 10 and the stator 20 so that the rotor 10 can rotate by electromagnetic interaction between the rotor 10 and the stator 20. The WFSM 1 may receive direct current from a DC source 40 by the field coil 12 through a slip ring 30. Three-phase alternating current from an AC source 50 is supplied to the stator 20 through the armature coil 22.

The WFSM 1 is controlled by a controller 60. An output of the WFSM 1 may be controlled through control of a field current supplied to the field coil 12. Specifically, since the output of the WFSM 1 is proportional to a field current and magnetic flux, and the magnetic flux is proportional to an armature current, the output of the WFSM 1 may be controlled through the field current and the armature current applied to the armature coil 22 and the field coil 12, respectively. Accordingly, the controller 60 may determine the field current $I_f$ applied to the field coil 12 and the armature current $I_a$ applied to the armature coil 22, so that determined values can be applied to the respective coils 12, 22. To this end, the controller 60 is configured to be able to control currents supplied to the field coil 12 and the armature coil 22 by the DC source 40 and the AC source 50, respectively, as necessary.

In addition, the WFSM 1 further includes a sensor 70. The sensor 70 may include a magnetic flux sensor 72, such as a Hall sensor, for measuring magnetic flux, a current sensor 74 for measuring current, and a torque sensor 76 for measuring the torque of the WFSM 1. A value measured by the sensor 70 is transmitted to the controller 60.

In the WFSM 1, a coil is used instead of a permanent magnet to create magnetic flux in the rotor 10, and the coil is wound around teeth of the rotor to generate field magnetic flux. As mentioned above, it takes a long time to reach a target current after the current is supplied to the field coil 12 formed of the superconducting wire when compared to a normal conducting coil.

A detailed description may be given in consideration of Equation 1. In general, a current i(t) flowing through a coil is charged by an inductance L component.

$$i(t) = \frac{1}{L} \int v(t) dt \qquad \text{Equation 1}$$

Here, t denotes time and v(t) denotes voltage with respect to time.

A current applied to a resistor-inductor circuit is expressed as in Equation 2 below, where E denotes an electromotive force and R denotes resistance.

$$i(t) = \frac{E}{R}\left(1 - e^{-\frac{R}{L}t}\right) \qquad \text{Equation 2}$$

Here, a time constant $\tau$ is given as in the following Equation 3.

$$\tau = \sqrt{\frac{L}{R}} \qquad \text{Equation 3}$$

That is, the resistivity is inversely proportional to the inductance L, and the time constant increases as the inductance L increases. Therefore, in case of the WFSM 1 including the superconducting coil, it takes a long time to reach the target current value.

Accordingly, the present disclosure can solve a problem of low responsiveness of the WFSM 1 having the superconducting coil by starting the WFSM 1 after at least a part or all of the field coil 12 is charged.

A description will be given of a control method of the WFSM 1 when the field coil 12 is completely charged 100% before the WFSM 1 is driven with reference to FIG. 3.

At step S10, when a target speed $\omega_r$, which is a rotational speed targeted by the WFSM 1, is less than or equal to a rated speed $\omega_r$, control according to the present embodiment is executed by the controller 60.

When the target speed $\omega_t$, of the WFSM 1 is less than or equal to the rated speed $\omega_r$, the controller 60 causes the DC source 40 to charge the field coil 12 in a stopped state of the WFSM 1 at S12. As a non-limiting example, the DC source 40 may be a battery or a secondary battery.

In addition, the controller 60 verifies whether the field coil 12 is fully charged or charged 100%. To this end, the controller 60 determines whether current magnetic flux $\Phi_c$, which is current field flux, has reached target magnetic flux $\Phi_t$ at S14. In some embodiments, the current magnetic flux $\Phi_c$ is measured by a magnetic flux sensor 72 provided in the WFSM 1. In some embodiments, the current magnetic flux $\Phi_c$ may be determined by the field current $I_f$ measured by the current sensor 74 provided in the WFSM 1. The controller 60 determines whether the current magnetic flux $\Phi_c$ has reached the target magnetic flux $\Phi_t$ based on a measured value of at least one of the magnetic flux sensor 72 or the current sensor 74.

When the current magnetic flux $\Phi_c$ does not reach the target magnetic flux $\Phi_t$, the operation returns to S12 so that the controller 60 causes the field coil 12 to be charged. When the current magnetic flux $\Phi_c$ generated in the field coil 12 is equal to or greater than the target magnetic flux $\Phi_t$, the controller 60 drives the WFSM 1 and controls driving of the WFSM 1 at S16. When the current magnetic flux $\Phi_t$ reaches the target magnetic flux $\Phi_t$, the WFSM 1 may generate rated torque $T_r$, and driving of the WFSM 1 may be controlled according to operating conditions.

Then the controller 60 determines whether the current magnetic flux $\Phi_c$ of the field coil 12 is maintained at the target magnetic flux $\Phi_t$ at S18. Specifically, the controller 60 determines whether the current magnetic flux $\Phi_c$ is equal to or greater than the target magnetic flux $\Phi_t$. Even at this time, the current magnetic flux $\Phi_c$ of the field coil 12 may be determined by the measured value of the magnetic flux sensor 72 or the current sensor 74.

The controller 60 determines whether the current magnetic flux $\Phi_c$ is following the target magnetic flux $\Phi_t$ while the WFSM 1 is being driven. When the current magnetic flux $\Phi_c$ is less than the target magnetic flux $\Phi_t$, the controller 60 controls driving of the WFSM 1 while increasing the field current $I_f$ at S19.

Conversely, when the current magnetic flux $\Phi_c$ is equal to or greater than the target magnetic flux $\Phi_t$ at step S18, the controller 60 checks the output of the WFSM 1. That is, the controller 60 compares current torque $T_c$ and a current speed $\omega_c$ of the WFSM 1 with target torque $T_t$ and the target speed $\omega_t$, respectively at S20. Specifically, the controller 60 determines whether the current torque $T_c$ is equal to or greater than the target torque $T_t$, and the current speed $\omega_c$ is substantially equal to the target speed $\omega_t$.

When the current torque $T_c$ is less than the target torque $T_t$, and the current speed $\omega_c$ is not the target speed $\omega_t$, the operation proceeds to a block A. As illustrated in FIG. 4, the case where the current torque $T_c$ is less than the target torque $T_t$ means that the field coil 12 has not been charged 100%. Thus, the operation returns to S12, so that the controller 60 may cause the field coil 12 to be charged at S201. When the current torque $T_c$ is equal to or greater than the target torque $T_t$, the controller 60 determines whether the current speed $\omega_c$ is not equal to the target speed $\omega_t$ at S203. In other words, when the current speed $\omega_c$ is greater or less than the target speed $\omega_t$, the controller 60 controls a rotational speed through control of a load angle of the armature current $I_a$ applied to an armature coil $I_a$ so that the current speed $\omega_c$ reaches the target speed $\omega_t$ at S205.

When the current torque $T_c$ and the current speed $\omega_c$ reach the target torque $T_t$ and the target speed $\omega_t$, respectively, the controller 60 determines whether the current torque $T_c$ falls within a preset range at S22. The preset range means that the current torque $T_c$ is greater than or equal to the target torque $T_t$, and is less than or equal to a certain ratio q of the target torque $T_t$. As a non-limiting example, the certain ratio q may be 1.03.

When the current torque $T_c$ is not within the preset range, the controller 60 reduces the armature current $I_a$ at S23. Then the operation returns to step S18. When the current torque $T_c$ exceeds the set range due to load fluctuation during driving of the WFSM 1, the armature current $I_a$ is controlled for control thereof.

When the current torque $T_c$ is within the preset range, the controller 60 determines whether the current magnetic flux $\Phi_c$ is maintained at the target magnetic flux $\omega_t$ or more at S24.

When the current magnetic flux $\Phi_c$ is maintained at the target magnetic flux $\Phi_t$ or more, the controller 60 continues to drive the WFSM 1 at S26. That is, since an operating state of the WFSM 1 is changed by an instantaneous load change, the current torque $T_c$ and the current speed $\omega_c$ are continuously fed back to drive the WFSM 1. Alternatively, when the target speed $\omega_t$ exceeds the rated speed $\omega_r$, during driving of the WFSM 1, the WFSM 1 is controlled according to a high-speed operation control flowchart of FIG. 6.

Conversely, upon determining in step S24 that the current magnetic flux $\Phi_c$ does not reach the target magnetic flux $\Phi_t$, the controller 60 increases the field current $I_f$ at S25.

A description will be given of a control method of the WFSM 1 when the field coil 12 is partially charged, for example, to a value between approximately 60 to 99.9%, with reference to FIG. 5.

At step S300, first, when the target speed $\omega_t$ of the WFSM 1 is equal to or less than the rated speed $\omega_r$, control according to the present embodiment is executed by the controller 60.

When the target speed $\omega_t$ of the WFSM 1 is less than or equal to the rated speed $\omega_r$, the controller 60 causes the DC source 40 to charge the field coil 12 in a stopped state of the WFSM 1 at S302. In this instance, the field coil 12 is only partially charged. For example, the field coil 12 is charged to 80%.

Then the controller 60 determines whether the current magnetic flux $\Phi_c$ has reached a preset ratio p of the target magnetic flux $\Phi_t$ at S304. The controller 60 compares the current magnetic flux $\Phi_c$ with the target magnetic flux $\Phi_t$ to verify whether the field coil 12 is charged. The ratio p may be 0.6 to 0.99. For example, when the field coil 12 is charged to 80%, the ratio p may be 0.8. Here, as for the current magnetic flux $\Phi_c$, a measurement value of at least one of the magnetic flux sensor 72 or the current sensor 74 may be similarly used.

When the current magnetic flux $\Phi_c$ does not reach the preset ratio p of the target magnetic flux $\Phi_t$, the operation returns to step S302, and the controller 60 causes the field coil 12 to be charged. On the other hand, when the current magnetic flux $\Phi_c$ is greater than or equal to the preset ratio p of the target magnetic flux $\Phi_t$, the controller 60 drives the WFSM 1, and since only a portion is charged, an insufficient output of the WFSM 1 is compensated for with the armature current $I_a$ (S306). That is, an output shortfall of the WFSM 1 is compensated through the armature current $I_a$. As for a current applied to the WFSM 1, a value measured through a shunt resistor is input to the controller 60. Accordingly, the torque and output of the WFSM 1 may be calculated based on parameters, such as a current value measured through the shunt resistor, and resistance and inductance set in the controller 60. In this way, the output shortfall may be determined.

At step S308, the controller 60 compares the current torque $T_c$ and the current speed $\omega_c$ with the target torque $T_t$ and the target speed $\omega_t$, respectively, to determine whether a target output has been reached (S20). Specifically, the controller 60 determines whether the current torque $T_c$ is equal to or greater than the target torque $T_t$, and the current speed $\omega_c$ is the target speed $\omega_t$.

When the current torque $T_c$ is less than the target torque $T_t$, or the current speed $\omega_c$ is not the target speed $\omega_t$, the controller 60 increases both the field current $I_f$ and the armature current $I_a$, and the operation returns to step S306 (S309).

When the current torque $T_c$ is equal to or greater than the target torque $T_t$, and the current speed $\omega_c$ is the target speed $\omega_t$, the controller 60 determines whether the current magnetic flux $\Phi_c$ has reached the target magnetic flux $\omega_t$ (S310).

When the current magnetic flux $\Phi_c$ is less than the target magnetic flux $\Phi_t$, the controller 60 increases the field current $I_f$ at S311. Conversely, when the current magnetic flux $\Phi_c$ is equal to or greater than the target magnetic flux $\Phi_t$, the controller 60 determines whether the current torque $T_c$ falls within a preset range at S312. The preset range means that the current torque $T_c$ is greater than or equal to the target torque Tt and is less than or equal to a certain ratio q of the target torque $T_t$. As a non-limiting example, the certain ratio q may be 1.03.

When the current torque $T_c$ is not within the preset range, the controller 60 reduces the armature current $I_a$ at S313. That is, when the current torque $T_c$ is increased out of the set range, the controller 60 controls the armature current $I_a$ so that the current torque $T_c$ is controlled. Then, the operation returns to step S308.

When the current torque $T_c$ is within the preset range, the controller 60 determines whether the current magnetic flux $\Phi_c$ is maintained at the target magnetic flux $\Phi_t$ or more in step S314.

When the current magnetic flux $\Phi_c$ is less than the target magnetic flux $\Phi_t$, the controller 60 increases the field current $I_f$ at S315, and the operation returns to step S310. Upon determining that the current magnetic flux $\Phi_c$ is maintained at the target magnetic flux $\Phi_t$ or more, the controller 60 may determine again whether the current torque $T_c$ is equal to or greater than the target torque $T_t$, and the current speed $\omega_c$ is approximately equal to the target speed $\omega_t$ at S316.

When the current torque $T_c$ and the current speed $\omega_c$ fail to reach the target torque $T_t$ and the target speed $\omega_t$, respectively, the controller 60 may increase the field current $I_f$ as necessary by returning to step S310.

When the current torque $T_c$ and the current speed $\omega_c$ reach the target torque $T_t$ and the target speed $\omega_t$, respectively, the controller 60 continues to drive the WFSM 1 at S26. That is, since an operating state of the WFSM 1 is changed by an instantaneous load change, the current torque $T_c$ and the current speed $\omega_c$ are continuously fed back to drive the WFSM 1. Alternatively, when the target speed $\omega_t$ exceeds the rated speed $\omega_r$ during driving of the WFSM 1, the WFSM 1 is controlled according to a high-speed operation control flowchart of FIG. 6.

Figure 3:
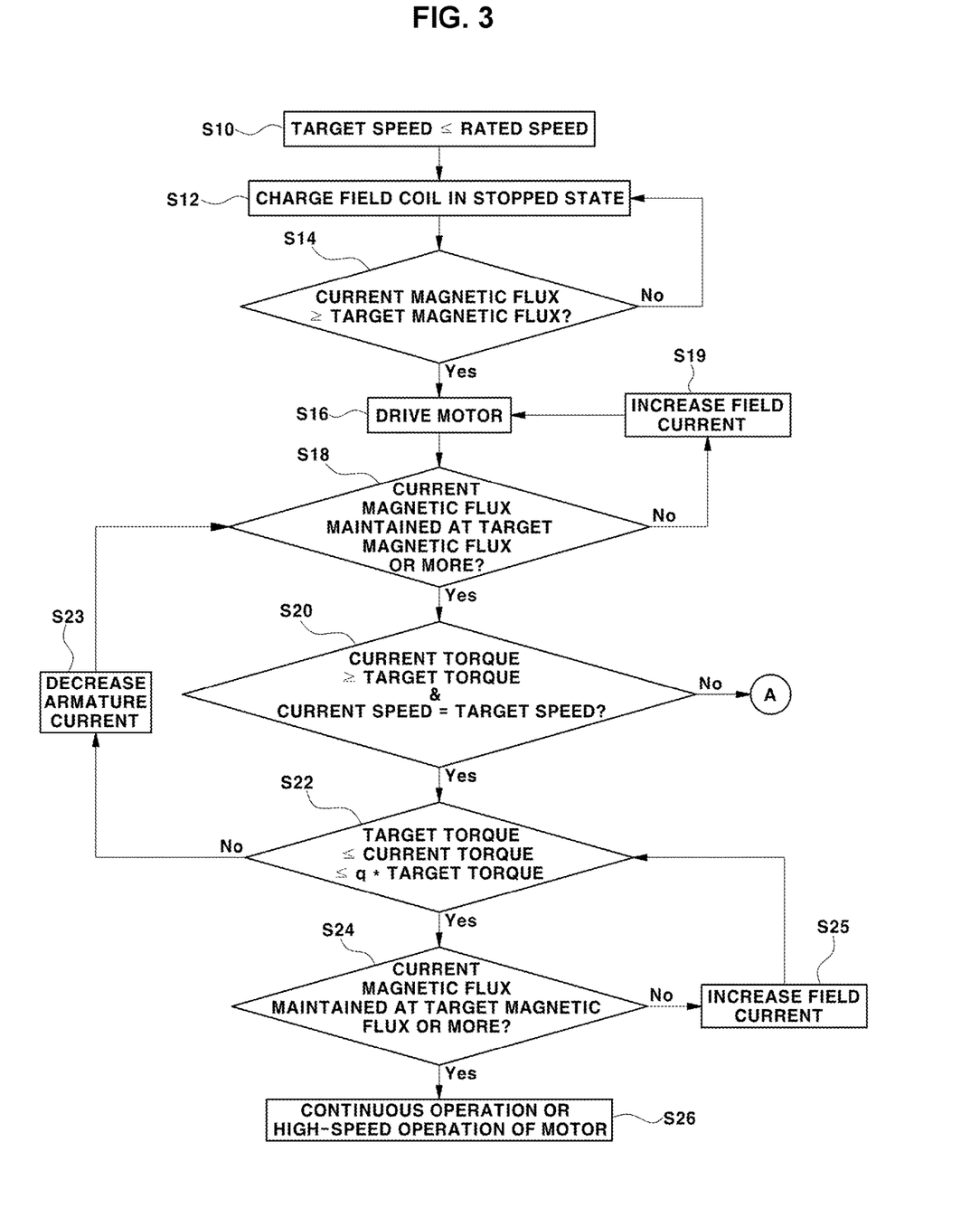
FIG. 3 illustrates a control flow diagram of the motor in accordance with some embodiments of the present disclosure.
Figure 4:
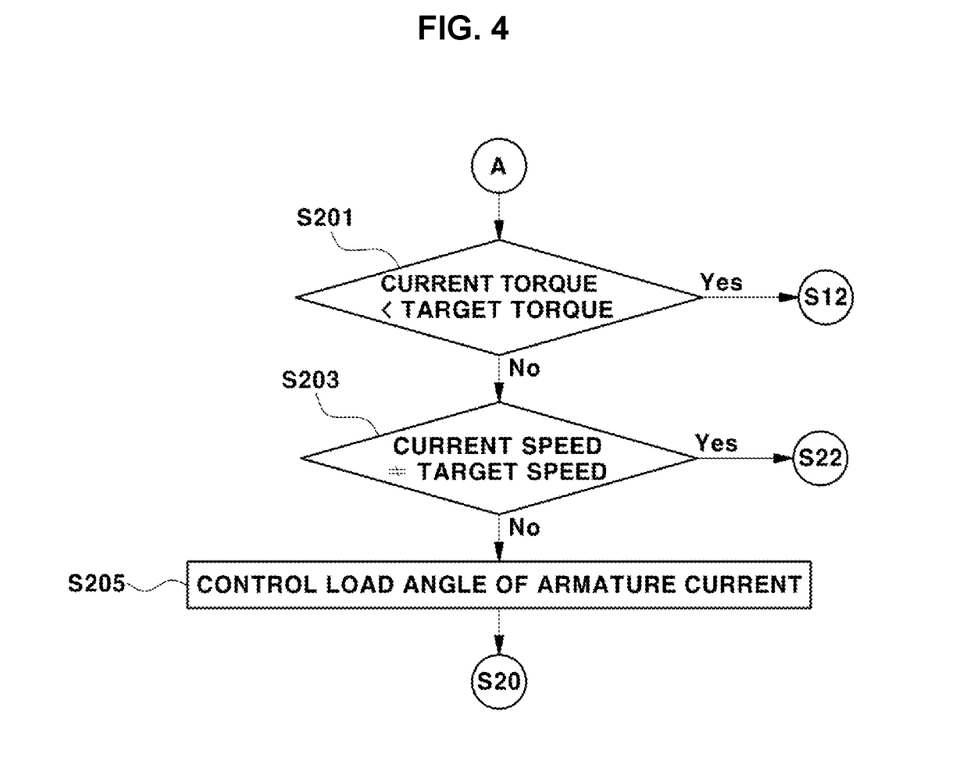
FIG. 4 is a detailed flowchart of a block A of FIG. 3.
Figure 5:
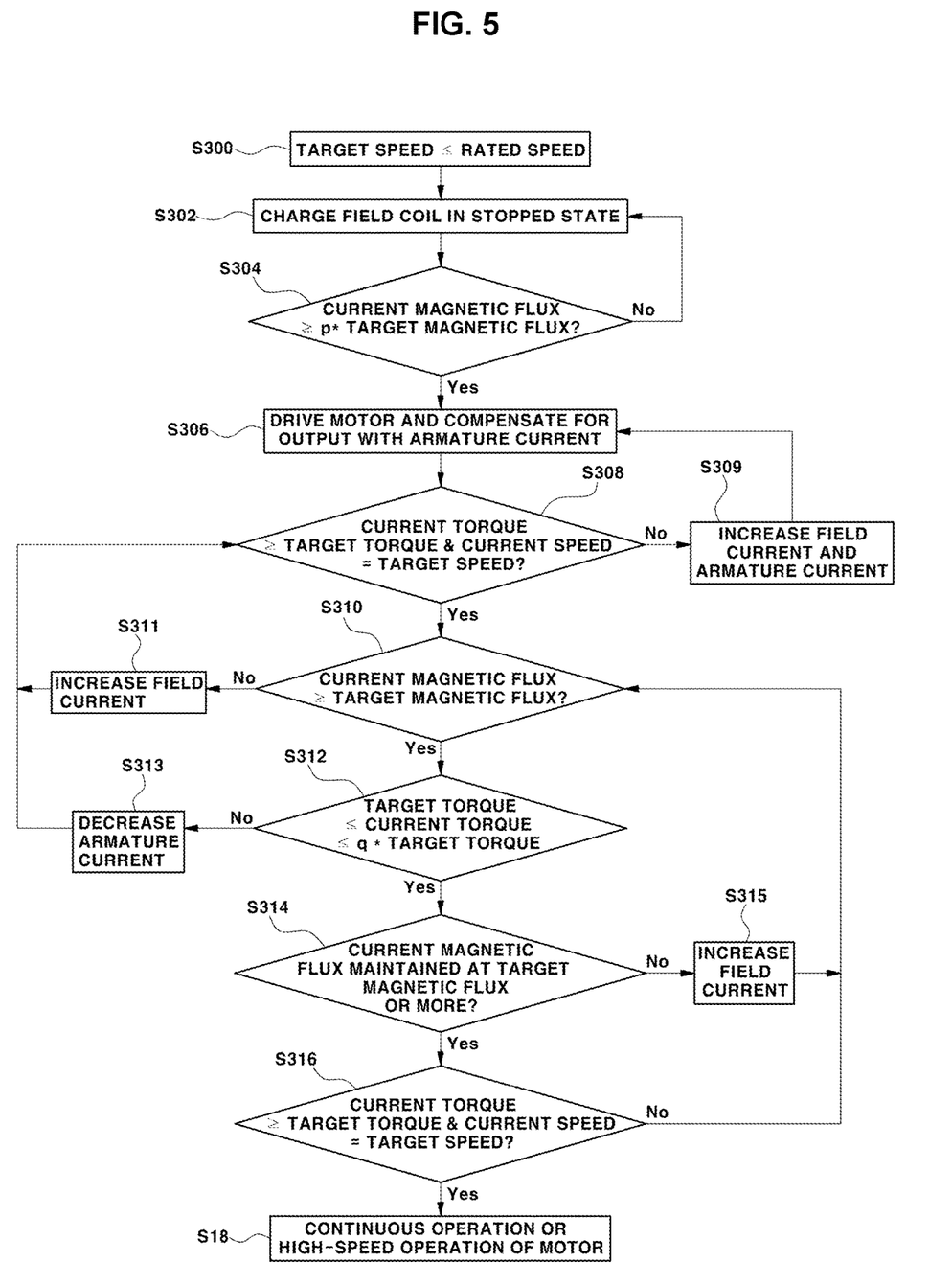
FIG. 5 illustrates a control flow diagram of the motor in accordance with some embodiments of the present disclosure.
Figure 6:
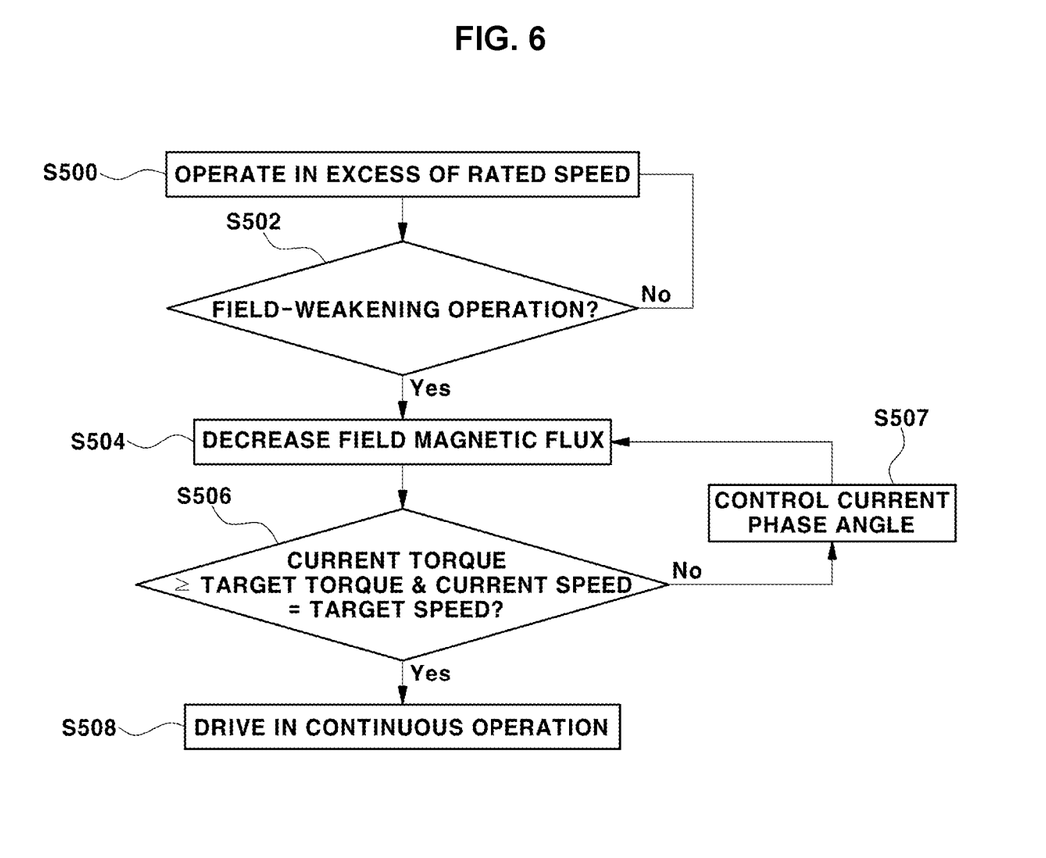
FIG. 6 illustrates a control flow diagram of the motor in accordance with some embodiments of the present disclosure.

When the target speed $\omega_t$ changes and exceeds the rated speed $\omega_r$ during driving of the WFSM 1 according to FIGS. 3 to 5, high-speed control illustrated in FIG. 6 may be applied.

Figure 7:
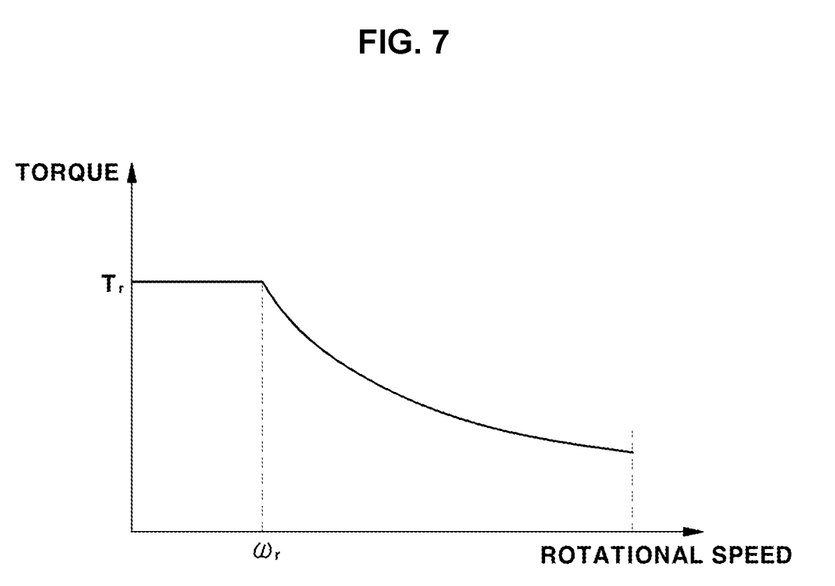
FIG. 7 illustrates a relationship between torque and a rotational speed of the motor.

When the WFSM 1 is operated in excess of the rated speed $\omega_r$ at S500, the controller 60 determines whether the WFSM 1 needs field-weakening operation at S502. Referring to FIG. 7, a relationship between a rotational speed and torque of the WFSM 1 is illustrated. Up to the rated speed $\omega_r$ of the WFSM 1, 100% of the ability of the field is utilized, and a voltage of the battery or the DC source 40 may be used as the maximum value. However, after the rated speed $\omega_r$, induced voltage increases while the rotational speed increases, making it difficult to increase the speed due to limitations of the voltage of the DC source 40. In order to increase the speed, the induced voltage is reduced by weakening the current magnetic flux $\Phi_c$ of the field. As the induced voltage decreases, a downward curve is created as the torque decreases. That is, the magnetic field flux is lowered to generate a desired speed in a region exceeding the rated speed $\omega_r$, and such operation of the motor is referred to as the field-weakening operation.

When the target speed $\omega_t$ exceeds the rated speed $\omega_r$, according to a current speed request, and the WFSM 1 is driven, the field-weakening operation is performed. In this case, the controller 60 reduces the field current $I_f$ so that the current magnetic flux $\Phi_c$ of the field is reduced at S504.

And the controller 60 determines the torque and speed at S506. Specifically, when the current torque $T_c$ is equal to or greater than the target torque $T_t$, and the current speed $\omega_c$ satisfies the target speed $\omega_t$, the controller 60 continuously receives feedback of the current torque $T_c$ and the current speed $\omega_c$, and drives the WFSM 1 at S508.

On the other hand, when the current torque $T_c$ is less than the target torque $T_t$, or the current speed $\omega_c$ is not the target speed $\omega_t$, weak magnetic flux is controlled through control of a current phase angle (S507). Weak magnetic flux control is a method of reducing a voltage by canceling magnetic flux generated in the field coil 12 of the rotor 10 when a current is applied to the armature coil 22 wound around the stator 20 with phase angle control. Due to time constant characteristics of the superconducting coil, a rate of change of magnetic flux during field-weakening control is significantly slow. The present disclosure may rapidly satisfy the required speed and torque by concurrently controlling the weak magnetic flux for fast response.

According to the present disclosure, by charging the field coil of the motor including the superconducting coil and then starting the motor, the required output may be immediately provided. In addition, the specifications of the inverter may be lowered by applying a current for creating magnetic flux required for the field before starting the motor.

In addition, according to the present disclosure, even when the field coil is charged at a certain rate instead of being fully charged, a target output may be provided through the armature current control, so that a start-up time may be reduced.

According to the present disclosure, there are provided a motor, particularly, a motor capable of providing a required output immediately by improving responsiveness of a WFSM in which a superconducting coil is used, and a method of controlling the same.

Effects of the present disclosure are not limited to those described above, and other effects not mentioned herein will be clearly recognized by those skilled in the art from the above description.

The present disclosure described above is not limited by the above-described embodiments and the accompanying drawings, and it will be apparent to those of ordinary skill in the art to which the present disclosure pertains that various substitutions, modifications, and changes are possible without departing from the technical idea of the present disclosure.

The invention claimed is:

1. A method of controlling a motor, the motor including a stator on which an armature coil is wound, a rotor positioned rotatably inside the stator, and on which a superconducting field coil is wound, and a controller configured to control the motor, the controller being configured to control an armature current supplied to the armature coil and a field current supplied to the field coil, the method comprising:
   comparing, by the controller, a target speed and a rated speed of the motor;
   charging, by the controller, the field coil before starting the motor in response to determining that the target speed is less than or equal to the rated speed; and
   driving, by the controller, the motor upon determining that a certain ratio of the field coil is charged, wherein the controller is configured to apply at least one of the field current or the armature current to the motor based on a state of the motor during driving of the motor; and
   performing, by the controller, a control operation so that field magnetic flux generated by the field coil decreases in response to determining that the target speed changes and exceeds the rated speed during driving of the motor.

2. The method of claim 1, wherein the state of the motor includes torque, a rotational speed, and magnetic flux of the motor.

3. The method of claim 1, wherein whether the field coil is charged is determined based on comparison between a current magnetic flux generated by the field coil and a preset target magnetic flux.

4. The method of claim 1, further comprising determining whether a current magnetic flux generated by the field coil is maintained at a preset target magnetic flux or more during driving of the motor.

5. The method of claim 4, wherein the controller is configured to increase the field current when the current magnetic flux is less than the target magnetic flux.

6. The method of claim 4, further comprising determining whether current torque of the motor is equal to or greater than target torque, and determining whether a current rotational speed of the motor is a preset target speed when the current magnetic flux is maintained at the preset target magnetic flux or more.

7. The method of claim 6, further comprising determining whether the current torque is within a preset torque range when the current torque is equal to or greater than the target torque, and the current rotational speed is the target speed.

8. The method of claim 7, wherein the controller is configured to decrease the armature current when current torque is not within a preset torque range.

9. The method of claim 7, wherein the preset torque range includes a value equal to or greater than the target torque and equal to or less than a certain ratio of the target torque.

10. The method of claim 6, wherein the controller is configured to recharge the field coil when the current torque of the motor is less than the target torque.

11. The method of claim 6, wherein the controller is configured to control a load angle of the armature current when the current rotational speed of the motor is not the target speed.

12. The method of claim 4, further comprising determining whether the current magnetic flux is equal to or greater than a product of a ratio p and the target magnetic flux when the ratio p is a value equal to or greater than 0.6 and less than 1.

13. The method of claim 12, further comprising driving the motor and supplying an armature current of a preset value when the current magnetic flux is equal to or greater than the product of the ratio p and the target magnetic flux.

14. The method of claim 13, further comprising increasing the field current and the armature current in response to the current torque not being equal to or greater than target torque, or the current rotational speed not being a target speed after supplying the armature current.

15. The method of claim 1, further comprising performing phase angle control of the armature current when a current torque of the motor is less than a target torque, and the current rotational speed is not the target speed.

16. A motor comprising:
   a stator on which an armature coil is wound;
   a rotor disposed inside the stator, and a superconducting field coil being wound on the rotor; and
   a controller configured to control the motor, wherein the controller is configured to:
   control an armature current supplied from an alternating current (AC) source to the armature coil and a field current supplied from a direct current (DC) source to the field coil;
   compare a target speed and a rated speed of the motor;
   charge at least a certain ratio of the field coil before starting the motor in response to determining that the target speed is less than or equal to the rated speed;
   drive the motor in response to determining that the certain ratio of the field coil is charged;
   apply at least one of the field current or the armature current to the motor based on a state of the motor during driving of the motor; and
   perform a control operation so that filed magnetic flux generated by the field coil decreases in response to determining that the target speed changes and exceeds the rated speed during driving of the motor.

17. The motor of claim 16, wherein the controller is configured to charge the field coil when a set target speed of the motor is equal to or less than a rated speed of the motor.

18. The motor of claim 16, wherein the controller is configured to communicate with a current sensor configured to measure a current applied to the motor or a magnetic flux sensor configured to measure magnetic flux generated in the motor.

* * * * *